(12) United States Patent
Kumaoka et al.

(10) Patent No.: US 9,492,884 B2
(45) Date of Patent: Nov. 15, 2016

(54) CONTROL DEVICE AND CONTROL METHOD FOR LASER PROCESSING MACHINE

(75) Inventors: Mototoshi Kumaoka, Chiyoda-ku (JP); Tomohiro Kyoto, Chiyoda-ku (JP); Naoki Miyamoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 13/880,136

(22) PCT Filed: Sep. 13, 2011

(86) PCT No.: PCT/JP2011/070898
§ 371 (c)(1),
(2), (4) Date: Apr. 18, 2013

(87) PCT Pub. No.: WO2012/053297
PCT Pub. Date: Apr. 26, 2012

(65) Prior Publication Data
US 2013/0220981 A1    Aug. 29, 2013

(30) Foreign Application Priority Data
Oct. 19, 2010    (JP) ................. 2010-234967

(51) Int. Cl.
*B23K 26/04*    (2014.01)
*B23K 26/00*    (2014.01)
(Continued)

(52) U.S. Cl.
CPC ............ *B23K 26/00* (2013.01); *B23K 26/128* (2013.01); *H01S 3/0401* (2013.01); *H01S 3/0407* (2013.01); *H01S 3/02* (2013.01); *H01S 3/036* (2013.01); *H01S 3/2232* (2013.01)

(58) Field of Classification Search
CPC ....... B23K 26/00; B23K 26/128; H01S 3/02; H01S 3/036; H01S 3/0401; H01S 3/0407; H01S 3/2232
USPC ............ 219/121.6, 121.11, 121.62, 121.69; 372/55, 58, 59; 700/166
See application file for complete search history.

(56) References Cited

U.S. PATENT DOCUMENTS

2006/0274806 A1* 12/2006 Sato et al. ...................... 372/58

FOREIGN PATENT DOCUMENTS

DE    102004040582    *    2/2006
JP    57-69383 A    4/1982
(Continued)

OTHER PUBLICATIONS

English language translation of DE102004040582, Carl Baasel Lasertechnik Gmbh & Co. Kg., Aug. 21, 2004.*
(Continued)

*Primary Examiner* — Dana Ross
*Assistant Examiner* — Joseph Iskra
(74) *Attorney, Agent, or Firm* — Sughrue Mion, PLLC; Richard C Turner

(57) ABSTRACT

In a laser processing machine 100 including a plurality of element units containing at least a laser blower unit 3, an optical-path purge unit 24, and a temperature controlling unit 8, a measurement unit and a control unit 10 are provided. The measurement unit measures an elapsed time from a final trigger at which a laser processing operation of the laser processing machine has stopped and no user operation is applied with respect to the laser processing machine. The control unit 10 stops the element units based on the elapsed time after the final trigger, when a condition specified for each of the element units is satisfied.

12 Claims, 6 Drawing Sheets

(51) Int. Cl.
  *B23K 26/12*  (2014.01)
  *H01S 3/04*  (2006.01)
  *H01S 3/02*  (2006.01)
  *H01S 3/036*  (2006.01)
  *H01S 3/223*  (2006.01)

(56)  References Cited

FOREIGN PATENT DOCUMENTS

| | | | |
|---|---|---|---|
| JP | 4-356981 | A | 12/1992 |
| JP | 5-261574 | A | 10/1993 |
| JP | 5-277781 | A | 10/1993 |
| JP | 05261574 | * | 10/1993 |
| JP | 11-156571 | A | 6/1999 |
| JP | 2000-140475 | A | 5/2000 |
| JP | 2000140475 | * | 5/2000 |
| JP | 2000-271767 | A | 10/2000 |
| JP | 2003-307331 | A | 10/2003 |
| JP | 2006-305597 | A | 11/2006 |
| JP | 2006-326673 | A | 12/2006 |
| JP | 2009-285674 | A | 12/2009 |

OTHER PUBLICATIONS

International Search Report for PCT/JP2011/070898 dated Dec. 20, 2011.

* cited by examiner

CONTROL DEVICE AND CONTROL METHOD FOR LASER PROCESSING MACHINE

CROSS REFERENCE TO RELATED APPLICATIONS

This application is a National Stage of International Application No. PCT/JP2011/070898 filed Sep. 13, 2011, claiming priority based on Japanese Patent Application No. 2010-234967 filed Oct. 19, 2010, the contents of all of which are incorporated herein by reference in their entirety.

FIELD

The present invention relates a control device and a control method for a laser processing machine that reduce the running cost of the laser processing machine.

BACKGROUND

In a machining standby state of a conventional laser processing machine, a laser blower, an optical path purge, an oscillator purge, and a cooling device are driven at all times, even during an idling operation in which laser processing is not in progress. Therefore, when a stop operation is not performed by an operator, the running cost is consumed although the laser processing is not actually performed.

With respect to the running cost problem due to wasteful operations of a plurality of functional elements, to prevent wasteful power consumption, a technique of switching a plurality of power supply units of a drive-system power supply corresponding to a plurality of motorized devices in a stepwise manner from a power-up state to a power-down state has been disclosed (see, for example, Patent Literature 1).

CITATION LIST

Patent Literature

Patent Literature 1: Japanese Patent Application Laid-open No. 2000-140475

SUMMARY

Technical Problem

However, according to the conventional technique described above, a stop time in the stepwise stop method is controlled by a predetermined time. Therefore, the motorized devices are stopped regardless of the processing mode of a user (an operator), and thus an effective reduction of the running cost depending on the characteristics of the laser processing machine has been difficult.

The present invention has been achieved in view of the above problems. An object of the present invention is to provide a control device and a control method for a laser processing machine that can deal with an unexpected change of a processing mode made by a user and reduce the running cost, by taking into consideration characteristics of respective functional elements constituting the laser processing machine.

Solution to Problem

The present invention is directed to a control device for a laser processing machine that includes a plurality of element units containing at least a laser blower unit, an optical-path purge unit, and a temperature control unit. The control device includes a measurement unit that measures an elapsed time from a final trigger at which a laser processing operation of the laser processing machine has stopped and no user operation is applied with respect to the laser processing machine, and a control unit that stops the element units based on the elapsed time after the final trigger, when a condition specified for each of the element units is satisfied.

Advantageous Effects of Invention

According to the present invention, the running cost of the entire laser processing machine can be reduced by reducing wasteful operations of respective functional elements in the laser processing machine.

DESCRIPTION OF EMBODIMENTS

Exemplary embodiments of a control device for a laser processing machine and a control method thereof according to the present invention will be explained below in detail with reference to the accompanying drawings. The present invention is not limited to the embodiments.

First Embodiment

Figure 1:
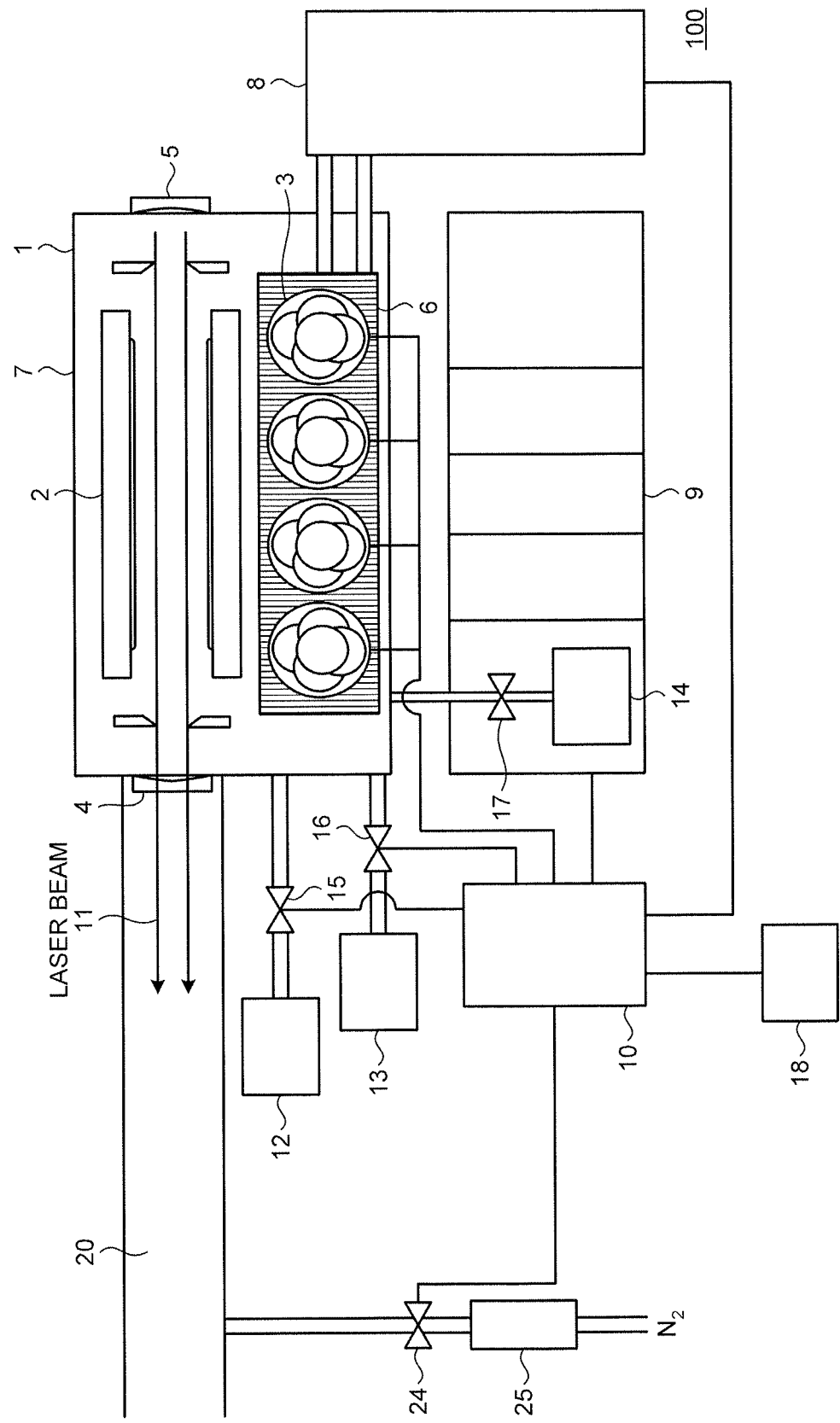
FIG. 1 depicts a configuration of a laser processing machine according to first to fourth embodiments.

FIG. 1 depicts a configuration of a laser processing machine 100 according to a first embodiment of the present invention. In FIG. 1, the laser processing machine 100 includes a laser oscillator 1, a discharge electrode 2 in the laser oscillator 1, a gas circulation blower 3 (laser blower unit) provided in the laser oscillator 1 to circulate laser gas in the laser oscillator 1, a partial reflection mirror 4 that reflects a part of laser beams 11 and transmits the other laser beams 11, a total reflection mirror 5 that totally reflects the laser beams 11, and a heat exchanger 6 that performs heat exchange for temperature control of the laser gas.

The laser oscillator 1 includes a vacuum case that accommodates therein the gas circulation blower 3, the discharge electrode 2, and the heat exchanger 6. The vacuum case 7 is filled with laser gas such as $CO_2$ having about a 1/10 atmospheric pressure (for example, 55 Torr) at the time of operating the laser oscillator 1.

The laser processing machine 100 also includes a temperature controlling unit 8 (temperature control unit). The temperature controlling unit 8 has a function of controlling the temperature of respective parts, that is, the partial reflection mirror 4, the total reflection mirror 5, the heat exchanger 6, the discharge electrode 2, and the like by feeding cooling water (heated water) thereto.

The laser processing machine 100 also includes a power panel 9 in which a device (not shown) that generates electric discharge in the discharge electrode 2, a device (not shown) that controls the gas circulation blower 3, a device (not shown) that causes the vacuum case 7 filled with laser gas for laser oscillation of the laser oscillator 1 to be evacuated, and the like are accommodated. The laser processing machine 100 further includes a control unit 10 that executes control relating to operation of the laser oscillator 1. The control unit 10 can control the gas circulation blower 3, the temperature controlling unit 8, and respective functional blocks of the laser processing machine 100 including an optical path purge function explained below, directly or via the power panel 9 or the like. An input terminal 18 such as a personal computer with which an operator can input various set values is connected to the control unit 10. The control unit 10 also has a function of measuring an elapsed time from a final trigger at which no user operation is applied with respect to the laser processing machine 100.

The laser beams 11 extracted from the laser oscillator 1 are irradiated to a workpiece (not shown) via an optical path 20 purged by $N_2$ (nitrogen). A high-pressure $N_2$ is connected to a regulator 25. An optical path purge by $N_2$ is executed, when $N_2$ is depressurized up to a pressure higher than the atmospheric pressure by the regulator 25, by filling the $N_2$ into the optical path 20 via a valve 24 in an "opened" state.

The laser processing machine 100 also includes a laser-gas supply source 12, a pressure gauge 13, and a vacuum pump 14. For example, the laser-gas supply source 12 is a gas cylinder that supplies laser gas to the vacuum case 7. The pressure gauge 13 measures the pressure in the vacuum case 7. The vacuum pump 14 has a function of vacuuming or evacuating the vacuum case 7. Valves 15, 16, and 17 are provided between the vacuum case 7 and the laser-gas supply source 12, the pressure gauge 13, and the vacuum pump 14, respectively.

Figure 2:
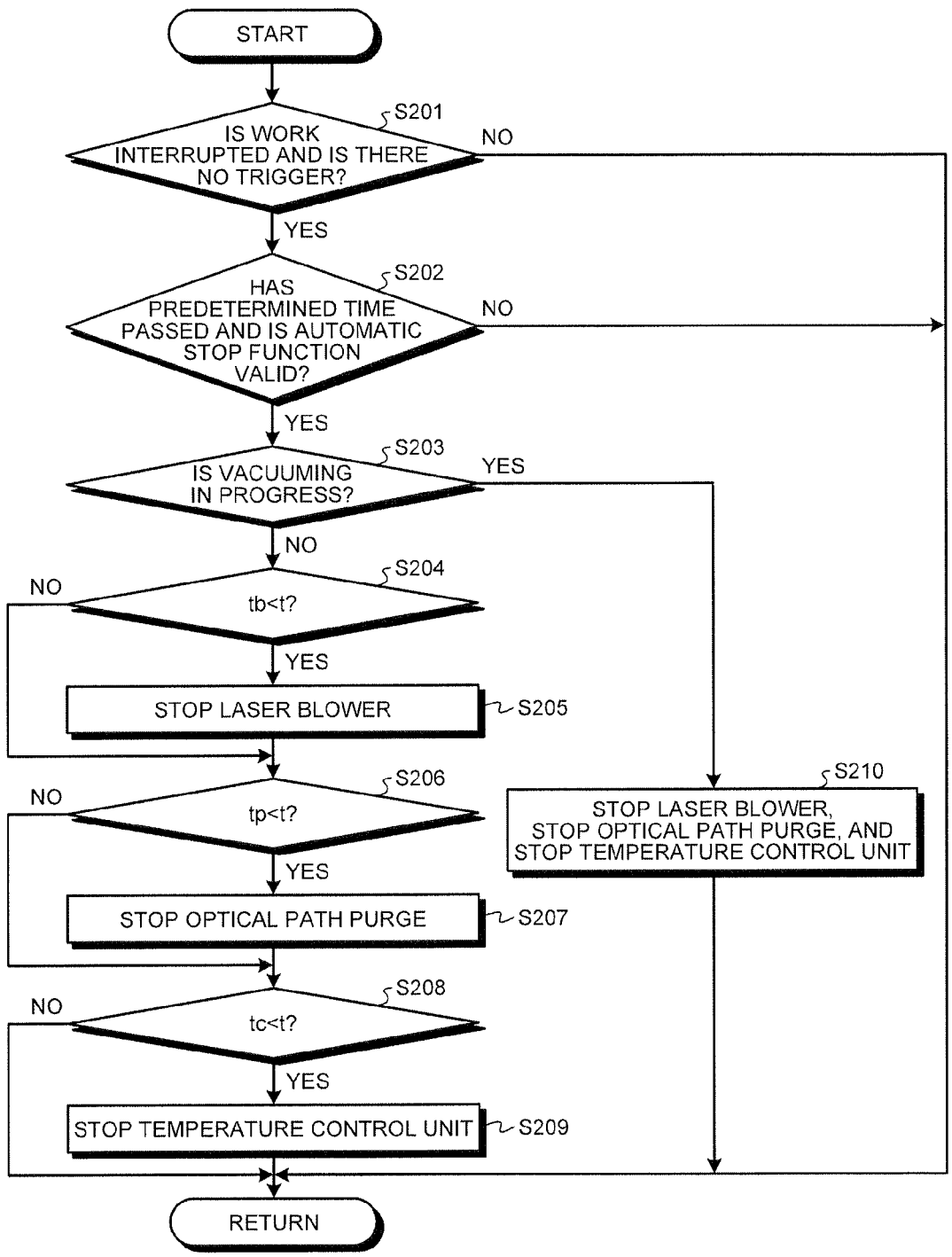
FIG. 2 is a flowchart of a control method of the laser processing machine according to the first embodiment.

A control method of the laser processing machine 100 according to the present embodiment is explained below with reference to a flowchart shown in FIG. 2. In the present embodiment, a time from the final trigger (a laser oscillation stop, screen operation or the like) until automatic stop is set in advance as a stop time with respect to the respective functional components of the laser processing machine 100.

For example, times such as a "laser-blower stop time: tb" (first stop time) with respect to the gas circulation blower 3, an "optical-path-purge stop time: tp" (second stop time) with respect to an optical path purge (filling of $N_2$ into the optical path 20 by "opening" of the valve 24), and a "temperature-control-unit stop time: tc" (third stop time) with respect to the temperature controlling unit 8, and a time from the final trigger until stop of these units are input and set by an operator (a user). These set values are input from, for example, the input terminal 18, and the control unit 10 executes the following control based on these set values with respect to the laser processing machine 100.

First, counting of time is started from a time point at which a laser processing work is not currently performed (during an idling operation), and the operator is not performing any operation with respect to the laser processing machine 100, that is, the last operation has been performed (at the time of the final trigger) (YES at Step S201). When the above conditions are not satisfied, such as a case where the operator performs a certain operation, the counting is reset (NO at Step S201).

When the counting is continued and the control (an automatic stop function) according to the present embodiment with respect to the laser processing machine 100 is valid (YES at Step S202), the process proceeds to Step S203. In other cases (NO at Step S202), the counting is reset. At Step S203, when vacuuming of the inside of the vacuum case 7 of the laser oscillator 1 is in progress (YES at Step S203), the gas circulation blower 3, the optical path purge (filling of $N_2$ into the optical path 20 by "opening" of the valve 24), and the temperature controlling unit 8 are all stopped immediately, regardless of the elapsed time from the final trigger (Step S210).

In the case other than during vacuuming (NO at Step S203), when the stop times tb, tp, and tc of the respective functional components are reached, the corresponding functional components are stopped. Specifically, as shown in FIG. 2, when an elapsed time t from the final trigger has exceeded "the laser-blower stop time: tb" (YES at Step S204), the gas circulation blower 3 (laser blower unit) is stopped (Step S205). When the elapsed time t from the final trigger has exceeded "the optical-path-purge stop time: tp" (YES at Step S206), the valve 24 is "closed" to stop an $N_2$ purge into the optical path 20 (Step S207). When the elapsed time t from the final trigger has exceeded "the temperature-control-unit stop time: tc" (YES at Step S208), the temperature controlling unit 8 (temperature control unit) is stopped (Step S209).

In the present embodiment, because an operator can set in advance the stop time for each functional component, automatic stop according to the intension of the operator can be realized. Because a time required for re-activating the respective functional components (a required activation time) and a stop time taking processing work contents into consideration can be set, for example, with respect to a functional component requiring a long time for re-activation, a stop time longer than the interval of the processing work time can be set such that the functional component is not stopped automatically.

In this case, because the functional component for which the stop time is set longer is not automatically stopped, there is no need to wait for activation at the time of re-activation, and when the operation is halted for a long time due to operator's circumstances, the work efficiency does not decrease owing to an automatic stop. On the other hand, by setting a shorter stop time with respect to the functional component that requires a shorter time for re-activation (a required activation time), wasteful operations can be reduced.

In this manner, in the present embodiment, during an idling operation in which the laser processing is not performed by the laser processing machine, and a stop operation by the operator is not performed, the respective functional components are automatically stopped according to the stop time set for each of the functional components, thereby enabling to reduce wasteful operations. Accordingly, the running cost of the entire laser processing machine can be reduced.

Second Embodiment

The configuration of the laser processing machine 100 according to a second embodiment is identical to that of FIG. 1. In the present embodiment, a standby permitted time, which is a time during which an operator (a user) can wait until the laser processing machine 100 is activated, is input in advance, for example, to the input terminal 18 by the operator. Activation and stop of the respective functional components are controlled according to a magnitude relation between the standby permitted time and the required activation time of the respective functional components.

Respective times (required activation times) tb', tp', tr', and tc' required from the stop state of the gas circulation blower 3 (laser blower unit), filling of $N_2$ into the optical path 20 by opening the valve 24 (optical-path purge unit), an oscillator purge unit (not shown), and the temperature controlling unit 8 (temperature control unit) until preparation completion are physically determined. Thus these times can be obtained by a calculation or the like.

For example, because a required laser-blower activation time tb', which is the required activation time of the gas circulation blower 3, is determined according to the setting of an inverter, the required laser-blower activation time is constant regardless of the state. That is, "tb'=constant value (Const.)".

Figure 3:
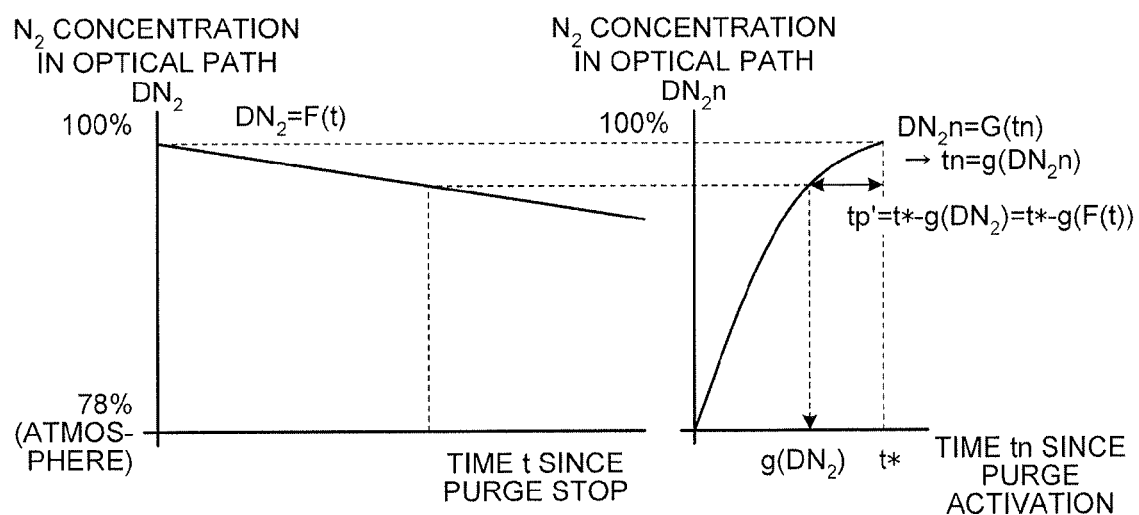
FIG. 3 depicts a relation between times from purge stop and from purge activation and an $N_2$ concentration in an optical path in the second embodiment.

The required activation time of the optical path purge is explained next with reference to FIG. 3. In FIG. 3, a relation between the time from purge stop and a $N_2$ concentration in the optical path (the left side in FIG. 3), and a relation between the time from purge activation and the $N_2$ concentration in the optical path (the right side in FIG. 3) are shown together, with longitudinal axes (the $N_2$ concentration in the optical path) being aligned.

Because an $N_2$ concentration $DN_2$ after the stop of the optical path purge decreases as the time t passes since the "closing" of the valve 24 (the stop of the optical path purge), the $N_2$ concentration $DN_2$ can be expressed by a concentration reduction function F(t) shown on the left side in FIG. 3:

$$DN_2 = F(t)$$

Meanwhile, because the $N_2$ concentration $DN_2$ after activation of the optical path purge ("opening" of the valve 24), as shown on the right side in FIG. 3, increases as a time to since the activation passes, the $N_2$ concentration $DN_2$ can be expressed by a concentration increase function G(tn):

$$DN_2 n = G(tn)$$

Assuming that the required purge activation time required from the time when a sufficient time has passed since the stop of the optical path purge (the inside of the optical path 20 is in the state of atmosphere: the $N_2$ concentration 78%) until the $N_2$ concentration in the optical path 20 becomes 100% is t*, and that an inverse function of $DN_2 n = G(tn)$ is $tn = g(DN_2 n)$, the required optical-path-purge activation time tp' is expressed by the following equation:

$$tp' = t^* - g(DN_2) = t^* - g(F(t))$$

That is, the required optical-path-purge activation time tp' can be obtained by the purge stop time t.

A required temperature-control-unit activation time tc' can be obtained by the following equation, based on a difference $\Delta Tc$ between a preparation completion temperature and the current temperature:

$$tc' = E(\Delta Tc)$$

A function E is determined by the ability of the temperature controlling unit 8, and tc' may be different depending on a magnitude relation between the preparation completion temperature and the current temperature, even if an absolute value of the temperature difference is the same. When the preparation completion temperature is lower than the current temperature, the temperature controlling unit 8 performs cooling. When the preparation completion temperature is higher than the current temperature, the temperature controlling unit 8 performs heating. The preparation completion temperature is, for example, 15° C. (the temperature during operation is 10° C.) or 25° C. (the temperature during operation is 30° C.).

Figure 4:
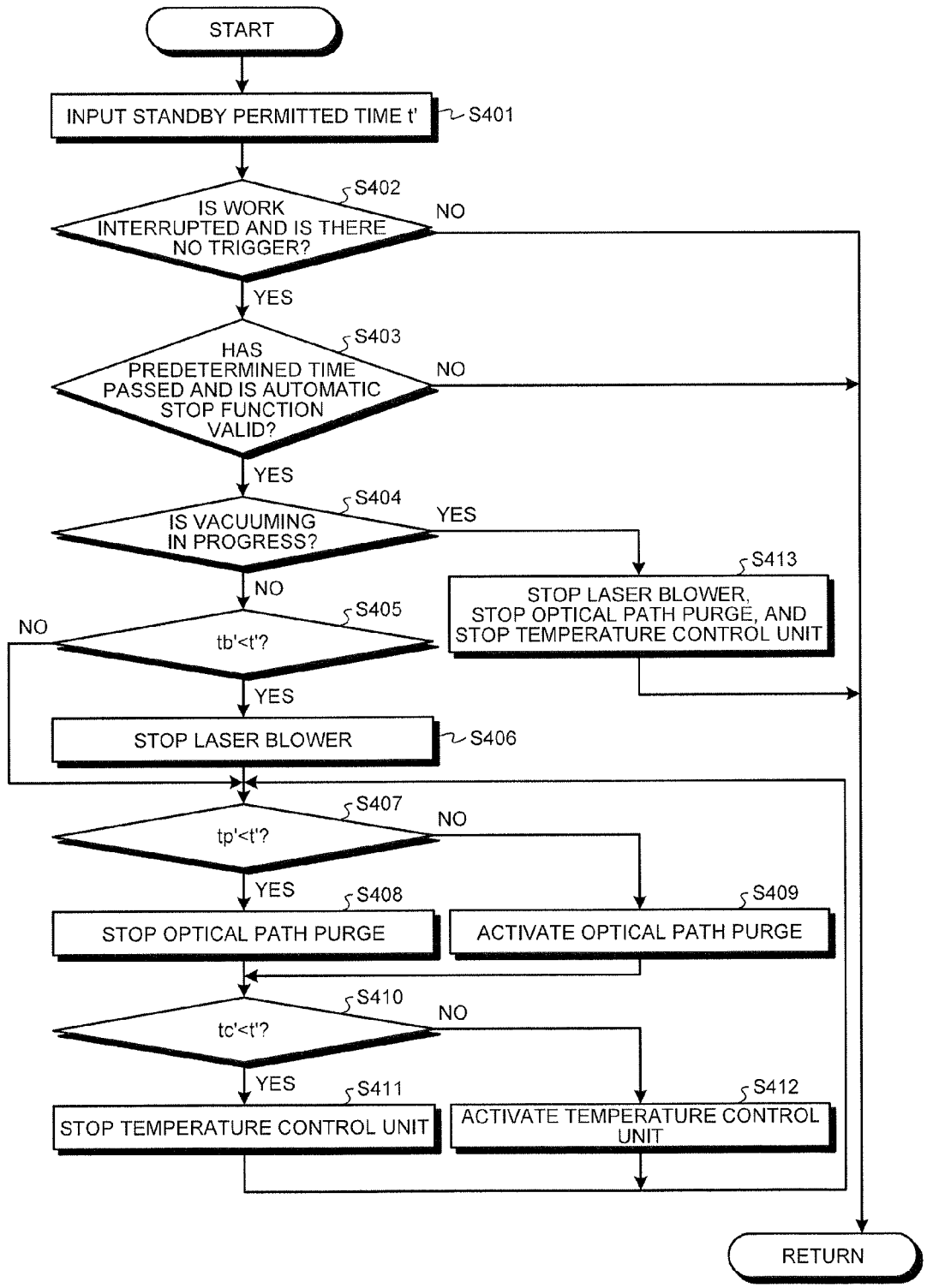
FIG. 4 is a flowchart of a control method of the laser processing machine according to the second embodiment.

A control method of the laser processing machine 100 according to the present embodiment is explained below with reference to a flowchart of FIG. 4.

A standby permitted time t', which is a time during which an operator (a user) can wait, is input in advance, for example, to the input terminal 18 by the operator, until the laser processing machine 100 is activated (Step S401).

Counting of time is started from a time point at which a laser processing work is not performed (during an idling operation), and the operator is not performing any operation with respect to the laser processing machine 100, that is, a time point at which the last operation has been performed (at the time of the final trigger) (YES at Step S402). When the above conditions are not satisfied, such as a case where the operator performs a certain operation, the counting is reset (NO at Step S402).

When the counting is continued, a predetermined time set in advance has passed, and the control (the automatic control function) according to the present embodiment with respect to the laser processing machine 100 is valid (YES at Step S403), the process proceeds to Step S404. In other cases (NO at Step S403), the counting is reset. At Step S404, when vacuuming of the inside of the vacuum case 7 of the laser oscillator 1 is in progress (YES at Step S404), the gas circulation blower 3, the optical path purge (filling of $N_2$ into the optical path 20 by "opening" of the valve 24), and the temperature controlling unit 8 are all stopped immediately (Step S413).

In the case other than during vacuuming (NO at Step S404), the process proceeds to Step S405. When the required laser-blower activation time tb' is shorter than the standby permitted time t' (YES at Step S405), the gas circulation blower 3 (laser blower unit) is stopped (Step S406). When the required laser-blower activation time tb' is longer than the standby permitted time t' (NO at Step S405), the activation state of the gas circulation blower 3 is maintained.

Thereafter, when the required optical-path-purge activation time tp' is shorter than the standby permitted time t' (YES at Step S407), the valve 24 is closed to stop the optical path purge or the stop state thereof is maintained (Step S408). When the required optical-path-purge activation time tp' is longer than the standby permitted time t' (NO at Step S407), the valve 24 is opened to activate the optical path purge or the activation state thereof is maintained (Step S409).

Furthermore, when the required temperature-control-unit activation time tc' is shorter than the standby permitted time t' (YES at Step S410), the temperature controlling unit 8 is stopped or the stop state thereof is maintained (Step S411). When the required temperature-control-unit activation time tc' is longer than the standby permitted time t' (NO at Step S410), the temperature control unit is activated or the activation state thereof is maintained (Step S412). Thereafter, the process returns to Step S407, and the control is maintained by the control unit 10.

When respective functional elements are stopped to reduce wasteful operations, a standby time is required because reactivation requires time. However, according to this method, wasteful operations can be reduced while the standby time can be included within the standby permitted time permitted by an operator. That is, the laser processing machine can be fully operated within the standby time permitted by the operator, and the running cost can be reduced effectively at the same time.

Third Embodiment

As explained in the second embodiment, in the functional elements of the laser processing machine, for example, the optical-path purge unit and the temperature control unit clearly have a parameter for determining the required activation time, respectively (for example, the $N_2$ concentration and the current temperature). In a third embodiment, an intermittent operation is performed for a functional element that can maintain the time required until the functional element is fully operated (required activation time) within a certain range, regardless of when an activation instruction is received during execution of the intermittent operation in which activation and stop are alternately repeated. Accordingly, the standby permitted time t' permitted by the operator is maintained. The configuration of the laser processing machine 100 according to the present embodiment is identical to that of FIG. 1.

Figure 5:
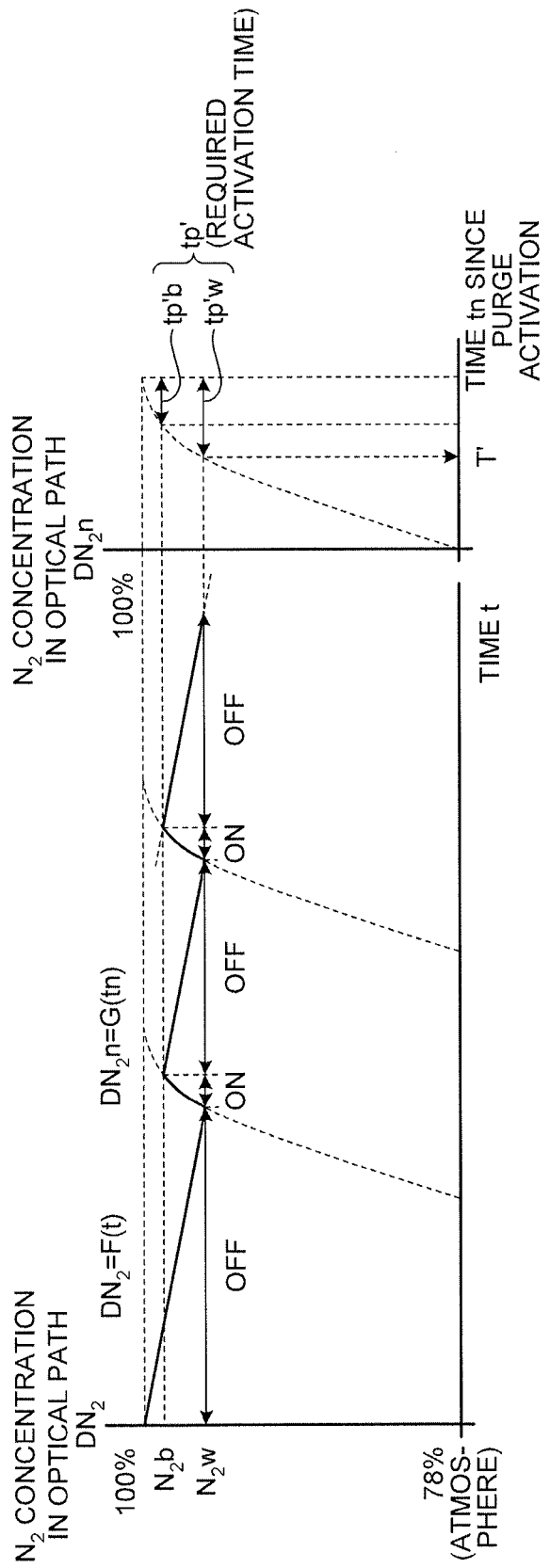
FIG. 5 depicts a change of an $N_2$ concentration in an optical path at the time of an intermittent operation of an optical path purge in the third embodiment.

For example, the intermittent operation of the optical path purge is explained with reference to FIG. 5, which depicts a change of the $N_2$ concentration in the optical path 20 at the time of the intermittent operation. In the intermittent operation in which the valve 24 as an inflow valve of $N_2$ is repeatedly opened and closed, when the valve 24 is closed (the optical path purge is OFF), the $N_2$ concentration in the optical path 20 decreases. When the $N_2$ concentration becomes a lowest concentration $N_{2w}$ during the intermittent operation, the $N_2$ concentration in the optical path 20 begins to increase if when the valve 24 is opened (the optical path purge is ON). When the $N_2$ concentration becomes a highest concentration $N_{2b}$ during the intermittent operation, the valve 24 is closed again (the optical path purge is OFF). Thereafter, this intermittent operation work is repeated.

By performing such a work, the longest required optical-path-purge activation time tp' during the intermittent operation is tp'w, which is a time required until the $N_2$ concentration changes from the lowest concentration $N_{2w}$ to 100%, and the shortest required optical-path-purge activation time tp' is tp'b, which is a time required until the $N_2$ concentration changes from the highest concentration $N_{2b}$ to 100%. Therefore, it is necessary that the condition of the longest required optical-path-purge activation time tp'w during "intermittent operation<the standby permitted time t'" is satisfied. This becomes possible by performing the intermittent operation so that the $N_2$ concentration in the optical path 20 is maintained at a value equal to or higher than the lowest concentration $N_{2w}$, based on the concentration reduction function $DN_2=F(t)$ at the time of stopping the optical path purge and the purge concentration function $DN_2n=G(tn)$ at the time of performing the optical path purge.

A key point in the intermittent operation is the lowest concentration $N_{2w}$ that determines the longest required activation time tp'w. It is necessary to satisfy the condition of "longest required activation time tp'w determined by this<standby permitted time t'". Therefore, the cycle between ON and OFF of the optical path purge can be changed, as long as the valve 24 is opened (the optical path purge is turned ON) when immediately the $N_2$ concentration has decreased to the lowest concentration $N_{2w}$ due to closing of the valve 24 (the optical path purge is turned OFF). That is, the highest concentration $N_{2b}$ during the intermittent operation can be arbitrarily set between $N_{2w}$ and 100%. Therefore, an optimum intermittent operation can be set while keeping a balance between the readiness and economic efficiency of the laser processing machine 100.

Similarly, with regard to the temperature controlling unit 8, the temperature controlling unit 8 measures a water temperature of cooling water (heated water), to perform the intermittent operation in which activation and stop of the temperature controlling unit 8 are alternately repeated so that a difference between the measured temperature and the preparation completion temperature as a target temperature falls within a certain range. In this manner, by maintaining the water temperature of cooling water (heated water) within a certain range from the preparation completion temperature, the required temperature-control-unit activation time tc' can be maintained within the standby permitted time t'.

Figure 6:
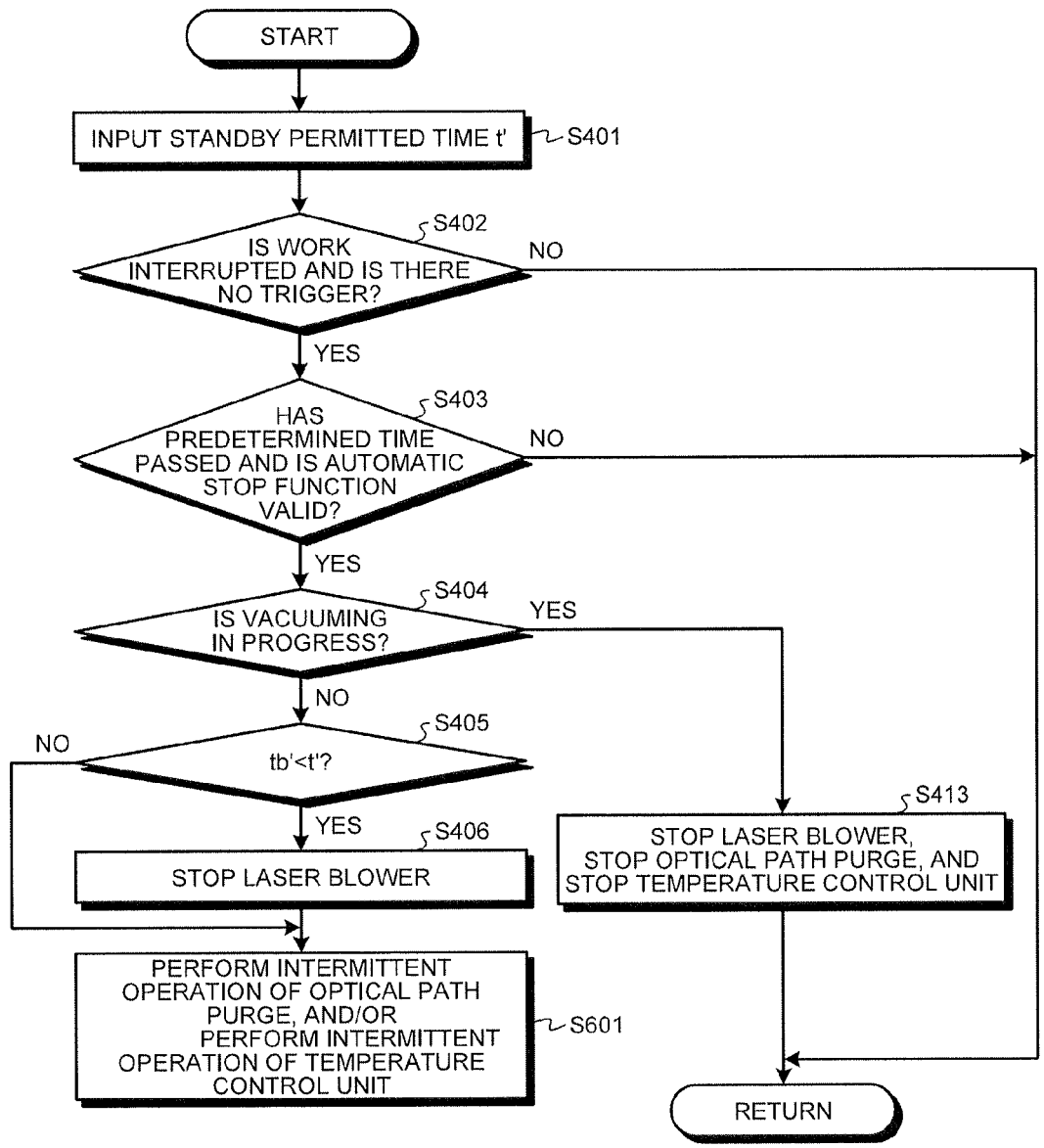
FIG. 6 is a flowchart of a control method of the laser processing machine according to the third embodiment.

A control method of the laser processing machine 100 according to the present embodiment is explained with reference to a flowchart of FIG. 6. In the flowchart of FIG. 6, the flows from Steps S401 to S406 and S413 are the same as those in FIG. 4. In FIG. 6, at steps S405 and S406, after it is determined whether to stop the gas circulation blower 3 or maintain the activation state thereof based on the magnitude relation between the required laser-blower activation time tb' and the standby permitted time t', at Step S601, the intermittent operation of the optical path purge and the temperature control unit is performed. The intermittent operation can be performed only for either the optical path purge or the temperature control unit, or can be performed for both the optical path purge and the temperature control unit.

As explained above, the required activation time of each element can be maintained within the standby permitted time t' set by the user, by performing the intermittent operation according to the control method of the laser processing machine 100 of the present embodiment. By this method, the required activation time within the standby permitted time desired by the operator can be realized all the time, in a state where the running cost is suppressed by the intermittent operation. That is, an optimum intermittent operation can be set while keeping a balance between the readiness and economic efficiency of the laser processing machine 100.

Fourth Embodiment

The configuration of the laser processing machine 100 according to a fourth embodiment is identical to that of FIG. 1. As explained in the second embodiment, for example, the respective times (required activation times) tb', tp', and tc' required from the stop state of the gas circulation blower 3 (laser blower unit), filling of $N_2$ into the optical path 20 by opening the valve 24 (optical-path purge unit), and the temperature controlling unit 8 (temperature control unit) until preparation completion are physically determined, and thus these times can be obtained by a calculation or the like. As described above, these values change for each functional element and also change according to the state at that time. Therefore, at the time of activating the laser processing machine 100, a functional element having the longest required activation time determines the required activation time of the entire laser processing machine 100.

In this case, when a functional element having a long required activation time and a functional element having a short required activation time are activated simultaneously, the functional element having the short required activation time is operated wastefully until the functional element having the long required activation time is activated (preparation completion), thereby generating a wasteful running cost for the wasteful operation.

Therefore, according to the present embodiment, when an activation operation is input to the laser processing machine 100 from the input terminal 18 by a user, for example, the required laser-blower activation time tb', the required purge activation time tp', and the required temperature-control-unit activation time tc' are calculated, to start an operation sequentially from the element having a longer required activation time so that the activation completion time of the respective functional elements become identical. Accordingly, wasteful operations by a functional element having a shorter required activation time until other functional elements are activated (preparation completion) can be reduced, thereby enabling to reduce the running cost at the time of activation of the laser processing machine 10.

Furthermore, because the control method of the laser processing machine according to the present embodiment is implemented when an activation operation is input in a state where the respective functional elements of the laser processing machine 10 are stopped, the control method can be implemented in combination with the control methods according to the first to third embodiments. Accordingly, the running cost of the laser processing machine can be further reduced.

Further, in the embodiments described above, the laser blower unit, the optical-path purge unit, and the temperature control unit are used and explained as examples of functional elements in the laser processing machine. However, the above embodiments can be also applied to other functional elements by setting the stop time and calculating the required activation time for each of these functional elements. That is, the invention of the present application is not limited to the above embodiments, and various modifications can be made within the scope of the invention at implanting stages thereof. In addition, inventions at various stages are included in the above embodiments, and various inventions can be extracted by appropriate combinations of a plurality of constituent elements disclosed herein.

For example, even when some constituent elements are omitted from all the constituent elements described in the first to fourth embodiments described above, as far as the problems mentioned in the section of Solution to Problem can be solved and effects mentioned in the section of Advantageous Effects of Invention are obtained, the configuration from which these constituent elements have been omitted can be extracted as an invention. Furthermore, constituent elements common to the first to fourth embodiments described above can be appropriately combined.

INDUSTRIAL APPLICABILITY

As described above, the control device and the control method for the laser processing machine according to the present invention are useful for reducing the running cost of a laser processing machine, and are particularly suitable for reducing the running cost of a laser processing machine during an idling operation.

REFERENCE SIGNS LIST 1 laser oscillator
2 discharge electrode
3 gas circulation blower
4 partial reflection mirror
5 total reflection mirror
6 heat exchanger
7 vacuum case
8 temperature controlling unit
9 power panel
10 control unit
11 laser beam
12 laser-gas supply source
13 pressure gauge
14 vacuum pump
15, 16, 17, 24 valve
18 input terminal
20 optical path
25 regulator
100 laser processing machine
S201 to S210, S401 to S413, S601 steps

The invention claimed is:

1. A control device for a laser processing machine that includes element units containing at least a laser blower unit, an optical-path purge unit, and a temperature control unit, the control device comprising:
   an input device configured to receive, in advance, an input of a first stop time, a second stop time, and a third stop time, based on a required activation time of each of the element units;
   a first stop unit configured to pre-store the input first stop time;
   a second stop unit configured to pre-store the input second stop time;
   a third stop unit configured to pre-store the input third stop time;
   a measurement unit configured to measure an elapsed time from a final trigger at which a laser processing operation of the laser processing machine has stopped and no user operation is applied with respect to the laser processing machine; and
   a control unit configured to automatically stop the element units individually after the final trigger, in response to the elapsed time exceeding each of the pre-stored first stop time, the pre-stored second stop time, and the pre-stored third stop time, of each of the element units.

2. The control device according to claim 1, wherein the first stop unit stops the laser blower unit when the elapsed time has exceeded the first stop time;
   the second stop unit stops the optical-path purge unit when the elapsed time has exceeded the second stop time that is longer than the first stop time; and
   the third stop unit stops the temperature control unit when the elapsed time has exceeded the third stop time that is longer than the second stop time.

3. A control device for a laser processing machine that includes element units containing at least a laser blower unit, an optical-path purge unit, and a temperature control unit, the control device comprising:
   an input device configured to receive, in advance, an input of required activation times for the element units, based on a required activation time of each of the element units;
   a stop unit configured to pre-store the input required activation times;
   a measurement unit configured to measure an elapsed time from a final trigger at which a laser processing operation of the laser processing machine has stopped and no user operation is applied with respect to the laser processing machine;
   a standby-permitted-time reception unit configured to receive an input of a standby permitted time in advance, which is a time during which a user can wait until the laser processing machine is activated; and
   a control unit configured to, after the elapsed time has exceeded a predetermined time, automatically stop a corresponding one of the element units or maintain a stopped state thereof when the pre-stored required activation time of the corresponding element unit is shorter than the standby permitted time, and activate a corresponding one of the element units or maintain an activation state thereof when the pre-stored required activation time of the corresponding element unit is longer than the standby permitted time.

4. The control device according to claim 3, wherein after the elapsed time has exceeded a predetermined time, the control unit stops the laser blower unit when a fixed value of a required laser-blower activation time is shorter than the standby permitted time; and maintains an activation state of the laser blower unit when the required laser-blower activation time is longer than the standby permitted time;

wherein after the elapsed time has exceeded a predetermined time, the control unit stops the optical-path purge unit or maintains a stopped state thereof when a required optical-path-purge activation time is shorter than the standby permitted time; and activates the optical-path purge unit or maintains an activation state thereof when the required optical-path-purge activation time is longer than the standby permitted time; and wherein after the elapsed time has exceeded a predetermined time, the control unit stops the temperature control unit or maintains a stopped state thereof when a required temperature-control-unit activation time is shorter than the standby permitted time; and activates the temperature control unit or maintains an activation state thereof when the required temperature-control-unit activation time is longer than the standby permitted time.

5. The control device according to claim 4, wherein an intermittent operation in which stop and activation of the optical-path purge unit are alternately repeated is performed so that the required optical-path-purge activation time is maintained equal to or less than the standby permitted time.

6. The control device according to claim 4, wherein an intermittent operation in which stop and activation of the temperature control unit are alternately repeated is performed so that the required temperature-control-unit activation time is maintained equal to or less than the standby permitted time.

7. The control device according to claim 1, wherein when an activation operation with respect to the laser processing machine is input by a user, the element units are activated sequentially starting with an element unit having a longer initial required activation time, so that an ending time of the initial required activation time required for an activation of each of the element units from a time of an input of the activation operation becomes identical.

8. The control device according to claim 1, wherein at a time of vacuuming inside of a laser resonator, all of the laser blower unit, the optical-path purge unit, and the temperature control unit are stopped.

9. The control device according to claim 3, wherein when an activation operation with respect to the laser processing machine is input by a user, the element units are activated sequentially starting with an element unit having a longer initial required activation time, so that an ending time of the initial required activation time required for an activation of each of the element units from a time of an input of the activation operation becomes identical.

10. The control device according to claim 3, wherein at a time of vacuuming inside of a laser resonator, all of the laser blower unit, the optical-path purge unit, and the temperature control unit are stopped.

11. The control device according to claim 1, wherein the second stop time that is longer than the first stop time,
    the third stop time that is longer than the second stop time, and
    each of the first stop time, the second stop time, and the third stop time is associated with a different respective element unit of the element units.

12. The control device according to claim 1, wherein the measurement unit is configured to measure a time period from the final trigger when no user operation is detected, and
    control unit is configured to stop the element units stepwise at unequal time intervals, after the time period lapses after the final trigger.

* * * * *